(12) United States Patent
Norman et al.

(10) Patent No.: US 9,841,071 B2
(45) Date of Patent: Dec. 12, 2017

(54) BRAKE

(75) Inventors: Mark Norman, South Wales (GB);
Alexander Howard, Newport (GB);
Jonathan Jackson, Herefordshire (GB);
Anthony Williams, Gwent (GB);
Simon Fisher, Monmouthshire (GB)

(73) Assignee: Meritor Heavy Vehicle Braking Systems (UK) Limited, Monmouthshire (GB)

( * ) Notice: Subject to any disclaimer, the term of this patent is extended or adjusted under 35 U.S.C. 154(b) by 1714 days.

(21) Appl. No.: 13/043,554

(22) Filed: Mar. 9, 2011

(65) Prior Publication Data

US 2011/0278112 A1 Nov. 17, 2011

(30) Foreign Application Priority Data

May 12, 2010 (GB) .................................. 1007907.7

(51) Int. Cl.
*F16D 51/20* (2006.01)
*F16D 121/14* (2012.01)
*F16D 125/26* (2012.01)
*F16D 125/30* (2012.01)
*F16D 125/56* (2012.01)

(52) U.S. Cl.
CPC .......... *F16D 51/20* (2013.01); *F16D 2121/14* (2013.01); *F16D 2125/26* (2013.01); *F16D 2125/30* (2013.01); *F16D 2125/56* (2013.01)

(58) Field of Classification Search
USPC .......... 188/78, 325, 326, 327, 328, 329, 330
See application file for complete search history.

(56) References Cited

U.S. PATENT DOCUMENTS

| 1,919,882 | A | * | 7/1933 | Evans | 188/330 |
| 3,037,584 | A | * | 6/1962 | Cox, Jr. et al. | 188/343 |
| 7,175,009 | B2 | * | 2/2007 | Clark et al. | 188/329 |

FOREIGN PATENT DOCUMENTS

| EP | 1022480 | 4/2002 |
| GB | 2002071 | 2/1979 |

OTHER PUBLICATIONS

United Kingdom Search Report dated Sep. 3, 2010 for Application No. GB1007907.7.

* cited by examiner

*Primary Examiner* — Robert A Siconolfi
(74) *Attorney, Agent, or Firm* — Brooks Kushman P.C.

(57) ABSTRACT

A brake includes a brake shoe moveable between an engaged position and a disengaged position and defining an axis of rotation of an associated brake drum. The brake includes an actuation shaft rotatable about a shaft axis and an actuation device for transferring rotational movement of the actuation shaft into movement of the brake shoe from the disengaged position to the engaged position. The axis of rotation is non-parallel to the shaft axis.

22 Claims, 9 Drawing Sheets

BRAKE

REFERENCE TO RELATED APPLICATION

This application claims priority to United Kingdom Application No. GB 1007907.7 filed May 12, 2010.

BACKGROUND OF THE INVENTION

The present invention relates to a brake, in particular a drum brake.

Drum brakes are known where a leading brake shoe and a trailing brake shoe are mounted on a brake support. The brake shoes are arcuate. The leading brake shoe is mounted on the brake support via a pivot, and the training brake shoe is mounted on the brake support via a pivot. At the end of the brake shoes remote from the pivots there is an "S" cam mounted on an actuation shaft. One leg of the S-cam engages the leading brake shoe, typically via a roller, and the other leg of the S-cam engages the trailing brake shoe, typically via a roller. Rotation of the actuation shaft causes the S-cam to move the rollers of the leading and trailing brake shoes apart, thereby engaging the friction surface of the leading and trailing brake shoes with the brake drum, thereby braking the brake drum.

On commercial vehicles, an end of the actuation shaft remote from the S-cam includes a lever, operated by an actuator, typically an air actuator. The air actuator and the lever are relatively bulky, and therefore space needs to be provided for these components.

The shaft axis is always parallel to the axis of rotation of the wheel (which is coincident with the axis of rotation of the brake drum). As such, the circumferential and radial positioning of the S-cam necessarily determines the circumferential and radial positioning of the end of the actuation shaft remote from the S-cam (since the shaft axis lies parallel to the wheel axis). Thus, freedom of design choice is limited in respect of known brakes.

An object of the present invention is to provide a brake which can more readily be designed for a vehicle wherein the space limitations for various components of the brake are limited.

SUMMARY OF THE INVENTION

There is provided a brake including a brake shoe moveable between an engaged position and a disengaged position and defining an axis of rotation of an associated brake drum. The brake includes an actuation shaft rotatable about a shaft axis and an actuation device for transferring rotational movement of the actuation shaft into movement of the brake shoe from the disengaged position to the engaged position. The axis of rotation is non-parallel to the shaft axis.

By angling the shaft axis relative to the axis of rotation of the wheel, the inboard end of the shaft, and hence the associated lever and air chamber, can be positioned other than at the same radial and/or circumferential position as the actuation device. For example, the inboard end of the actuation shaft need not be positioned at the same radial and/or circumferential position as an S-cam actuation device or a Z-cam actuation device.

There is also provided a brake including a brake shoe having an arcuate friction surface defining a shoe axis. The brake shoe is moveable between an engaged position and a disengaged position. The brake includes an actuation shaft rotatable about a shaft axis and an actuation device for transferring rotation movement of the shaft into movement of the arcuate brake shoe from the disengaged position to the engaged position. The shoe axis is non-parallel to the shaft axis.

BRIEF DESCRIPTION OF THE DRAWINGS

The invention will now be described, by example only, with reference to the accompanying drawings in which.

DETAILED DESCRIPTION OF THE PREFERRED EMBODIMENT

With reference to FIGS. 1 to 5, there is shown a brake 10 having an arcuate brake shoe. In this case, the brake shoe is a leading shoe 12 having a leading edge 14 and a trailing edge 16. The leading shoe 12 is pivotally mounted near the trailing edge 16 on a pivot 18. The leading shoe 12 has friction material 20 bonded and/or riveted, or otherwise fixed, to the shoe body 22. The friction material 20 has an arcuate friction surface 21. Near the leading edge 14 of the leading shoe 12 is a pin 24 about which is rotatably mounted a cylindrical roller 26. The cylindrical roller 26 therefore rotates about an axis 25. The leading shoe 12 is entirely conventional and is known from the prior art.

The pivot 18 is mounted on a brake support 30. The brake support 30 is non-rotatably fixed to a vehicle, typically to an end of an axle of the associated vehicle via holes 31. The brake support 30 therefore defines a mounting side 32 of the brake 10 and a non-mounting side 34 of the brake 10 on an opposite side of the brake shoe from the mounting side 32. Typically, when the brake support 30 is mounted on the associated vehicle, a mounting side 32 will equate to an inboard side of the brake 10, and the non-mounting side 34 will equate to an outboard side of the brake 10. An actuation shaft 40 is rotatably mounted in a boss 33 of the brake support 30. The actuation shaft 40 is rotatable about a shaft axis S.

A brake drum (not shown) is mounted on a hub associated with a wheel. The wheel rotates counter-clockwise when viewing FIG. 2 when the associated vehicle is travelling in a forwards direction. The wheel rotates about a wheel axis D, and the brake drum rotates about a drum axis A, which is coincident with the wheel axis D. As will be appreciated, the arcuate friction surface 21 defines a shoe axis C which, when the brake shoe is in the engaged position, is coincident with the drum axis A and the wheel axis D.

Figure 4:
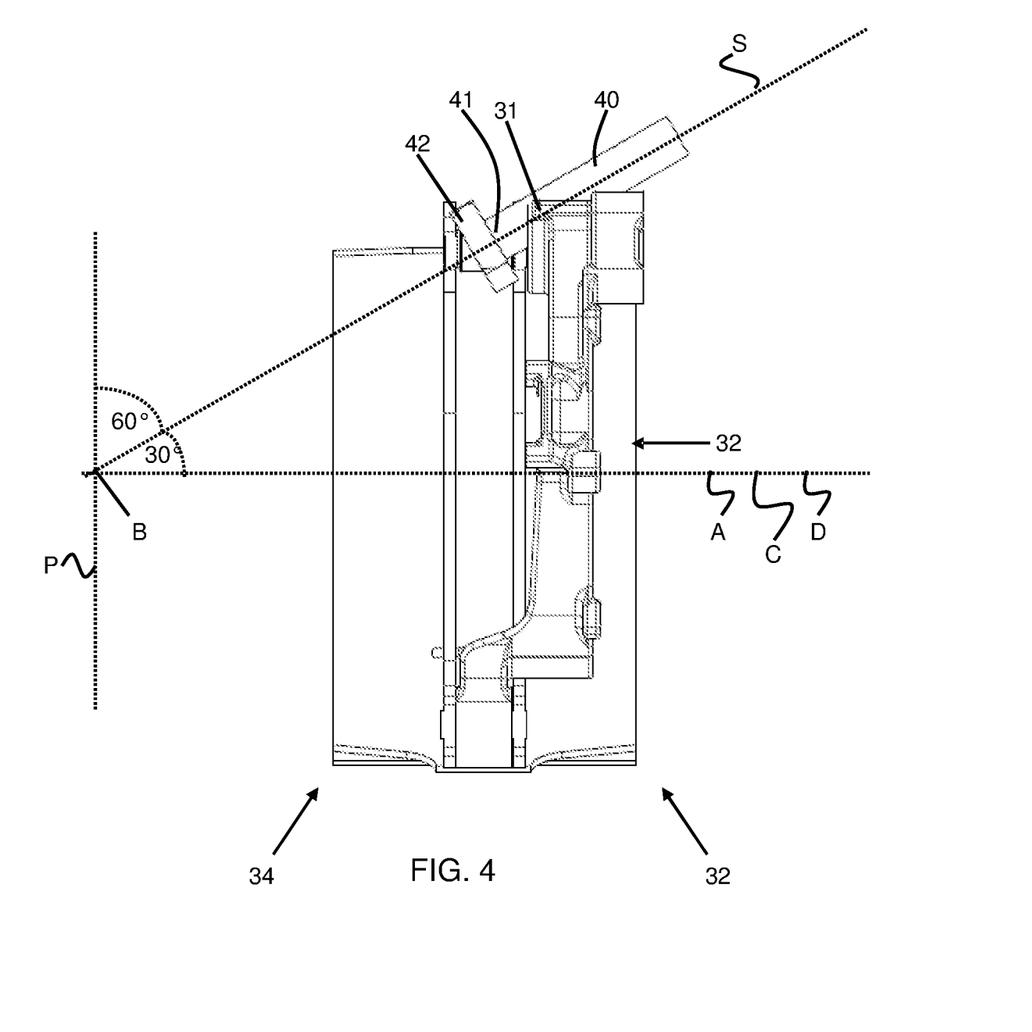
FIG. 4 shows a rear view of the brake of FIG. 1.

As can be seen from FIG. 4, a shaft axis S is angled (at a non zero angle) relative to the drum axis A, in this case by 30°. The point of intersection B of the shaft axis S with the drum axis A is on the non-mounting side 34 of the brake 10.

Figure 1:
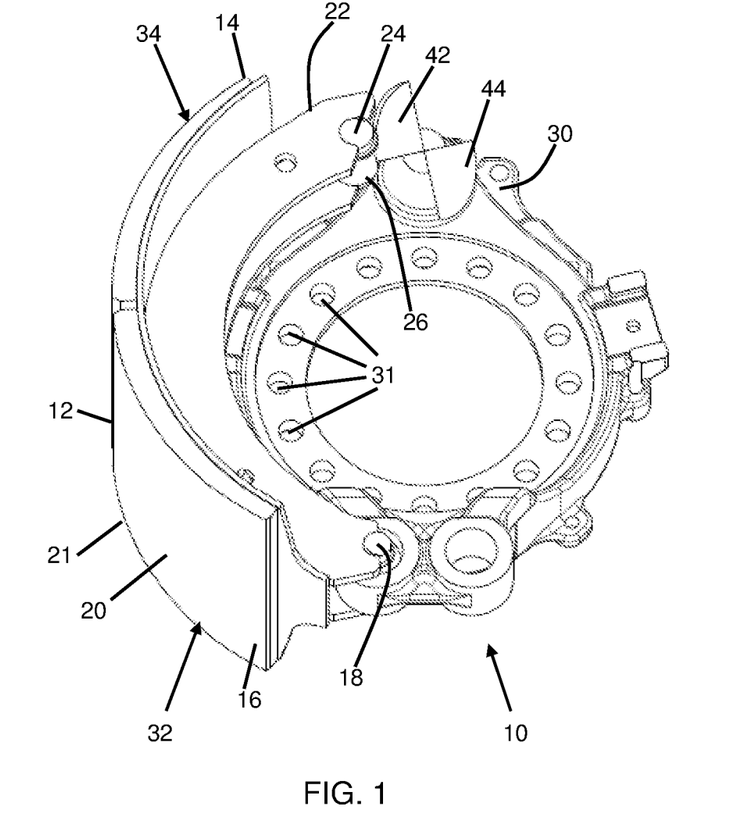
FIG. 1 shows an isometric view of a brake in a disengaged position.

Mounted on an end 41 of an actuation shaft 40 is a cam 42. Counter-clockwise rotation of the actuation shaft 40, and hence counter-clockwise rotation of the cam 42 (when viewing FIG. 1), from the position shown in FIG. 1 to the position shown in FIG. 5 causes the leading shoe 12 to move from the disengaged position as shown in FIG. 1 to the engaged position shown in FIG. 5, thereby applying the brake 10. As can be seen when comparing FIGS. 1 and 5, the leading shoe 12 pivots about the pivot 18 when moving between the disengaged position and the engaged position.

As the cam 42 rotates, it makes line contact with the roller 26. Thus, while the cam 42 rotates about the shaft axis S, the line contact a cam surface 43 makes with the roller 26 is defined by a line that is parallel to the drum axis A. Cam profiles can be considered to be a cam lobe profile applied to a base circle.

In conventional brakes where the cam shaft axis is parallel to the wheel axis, the base circle is defined by a cylinder with a cam profile being applied to the cylindrical base circle. However, in one embodiment of the present invention, the base circle of the cam 42 is defined by a cone with an appropriate lobe profile applied. In this case, the brake 10 further includes a trailing shoe (not shown) mounted opposite the leading shoe 12. The actuation shaft 40 also includes a trailing cam 44. As such, rotation of the actuation shaft 40 will apply both the leading shoe 12 and the trailing shoe to the inner surface of the brake drum.

Figure 4A:
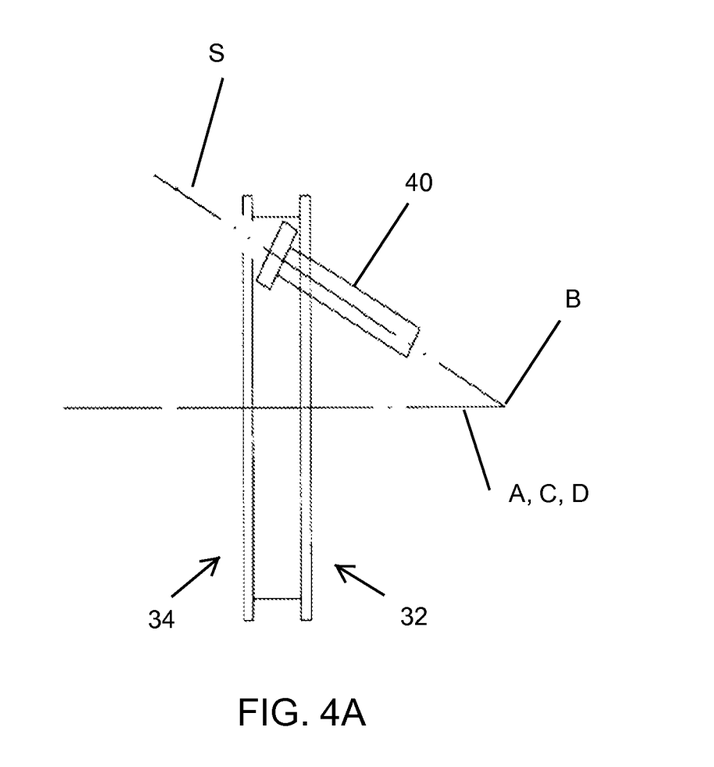
FIG. 4A shows a rear view of the brake of FIG. 1 according to another embodiment.
Figure 5:
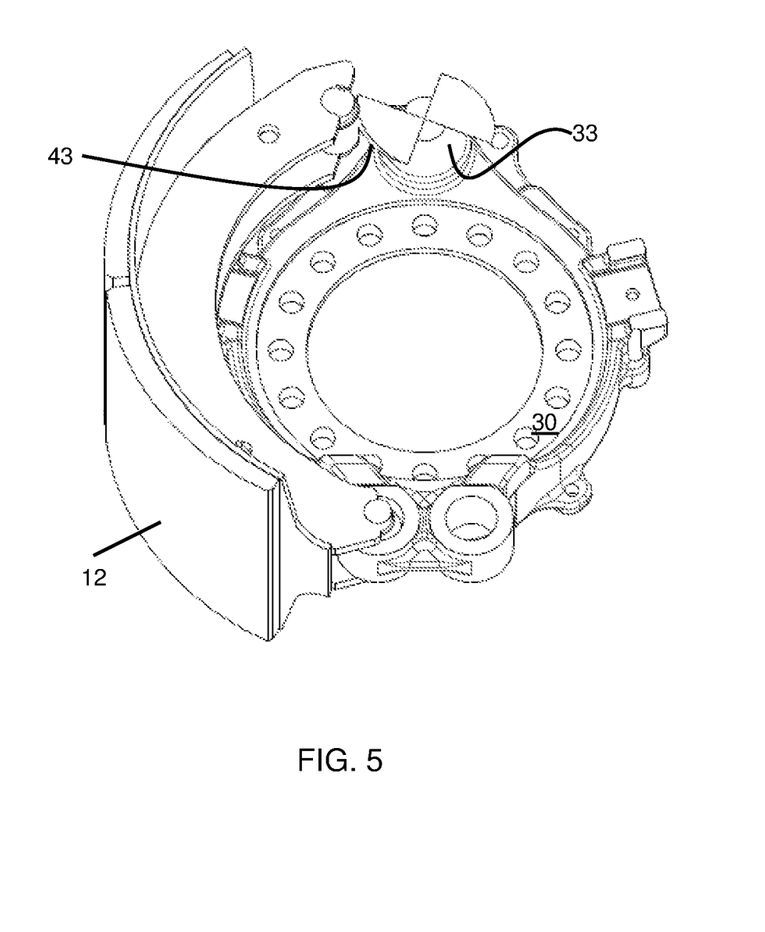
FIG. 5 shows an isometric view of the brake of FIG. 1 in an engaged position.

As previously mentioned, the point of intersection B of the shaft axis S and the drum axis A is positioned on the non-mounting side 34 of the brake shoe. In further embodiments, as shown in FIG. 4A, the shaft axis S could be angled relative to the drum axis A such that the point of intersection B of the shaft axis S with the drum axis A is on the mounting side 32 of the brake 10.

As mentioned above, the drum axis A is angled at 30° relative to the shaft axis S. In further embodiments this angle could be varied, for example the drum axis A could be angled relative to the shaft axis S between 5° and 30°, alternatively between 5° and 20°, or alternatively between 5° and 15°.

The shaft axis S is angled relative to a plane P perpendicular to the axis of rotation. As shown in FIG. 4, the shaft axis S is angled at 60° relative to the drum axis A. In further embodiments the shaft axis S could be angled relative to a plane perpendicular to the drum axis A between 60° and 85°, alternatively between 70° and 85°, and alternatively between 75° and 85°, and this applies to the shaft axes which intersect the drum axis A and also to the shaft axes which are skew relative to the drum axis A (see below).

As mentioned above, the line of contact between the leading cam 42 and the brake shoe (in this case the roller 26) is parallel to the drum axis A. In further embodiments, the line contact between the cam 42 and the brake shoe could be parallel to the shaft axis S. In further embodiments, the line contact between the cam surface 43 and the brake shoe could be non-parallel to the shaft axis S and non-parallel to the drum axis A.

The surface 27 of the roller 26 is cylindrical. In further embodiments, the surface of a roller need not be cylindrical, in particular the surface could be conical.

Figure 2:
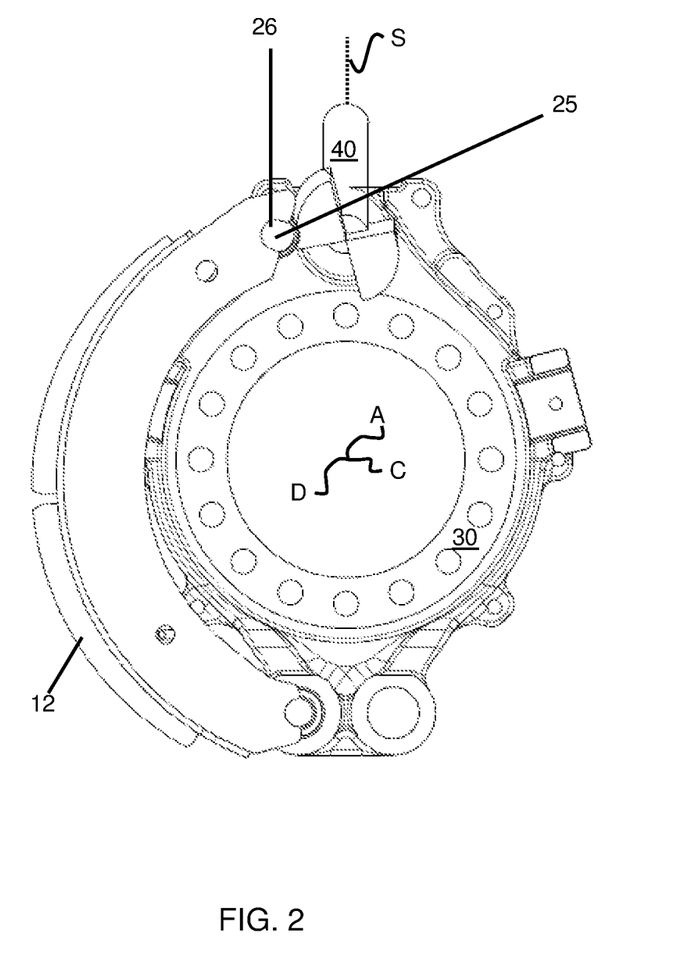
FIG. 2 shows a side elevation of the brake of FIG. 1.
Figure 3:
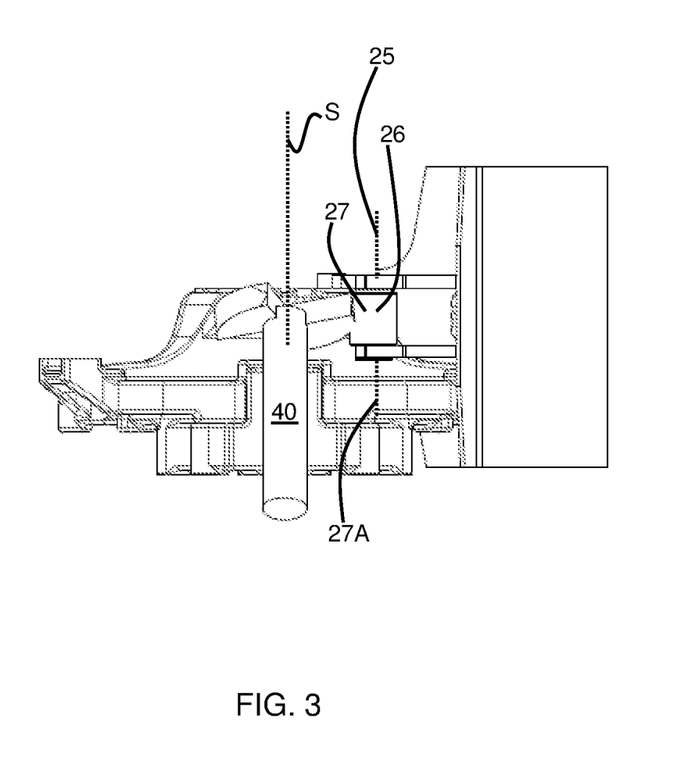
FIG. 3 shows a plan elevation of the brake of FIG. 1.

As shown in FIG. 2, the axis 25 about which the roller 26 rotates is parallel to the drum axis A. In further embodiments, the axis 25 of the roller 26 engaged by a cam 42 may be parallel to the actuation shaft axis S. Alternately, the axis 25 of the roller 26 may be non-parallel to the actuation shaft axis S and non-parallel to the drum axis A.

As mentioned above, the drum axis A intersects the shaft axis S. In further embodiments, the drum axis A can be non-parallel to the shaft axis S and does not intersect the shaft axis S. In other words, the drum axis A could be skew relative to the shaft axis A (see FIGS. 6 to 8 and the description below). Where the drum axis A is skew relative to the shaft axis S, there is a point on the shaft axis S which is closest to the drum axis A. This point can be positioned on the non-mounting side 34 of the brake 10, alternatively this point can be positioned on the mounting side 32 of the brake 10.

As mentioned above, known brakes have a cam shaft rotatable about an axis parallel to the wheel axis. Other known brakes utilize a "Z-cam" mechanism. A Z-cam uses relatively short push rods to operate the leading and trailing shoes. The present invention can be applied to brakes using Z-cam mechanisms.

Figure 6:
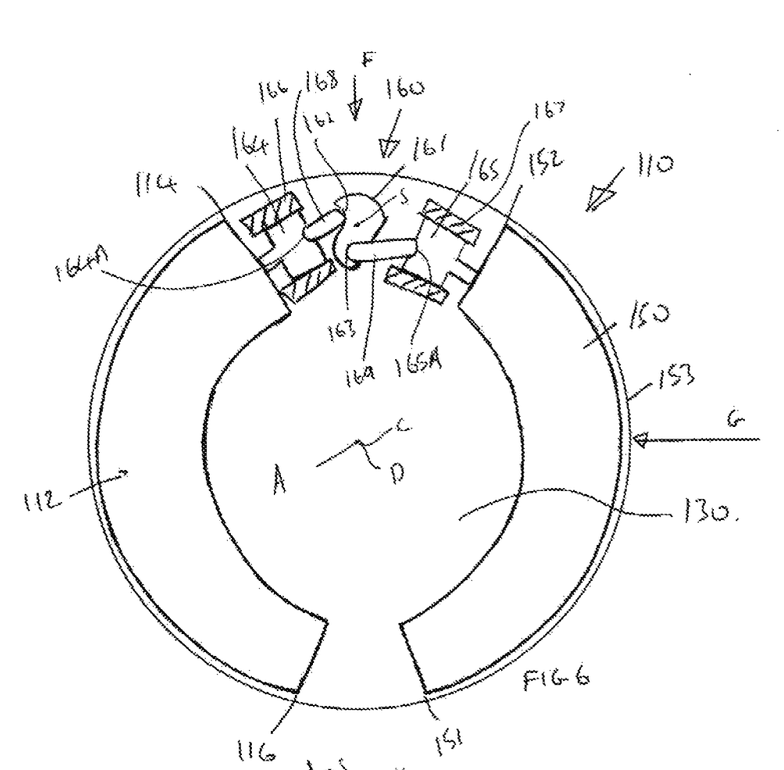
FIG. 6 shows a side elevation schematic view of a second embodiment of a brake.
Figure 7:
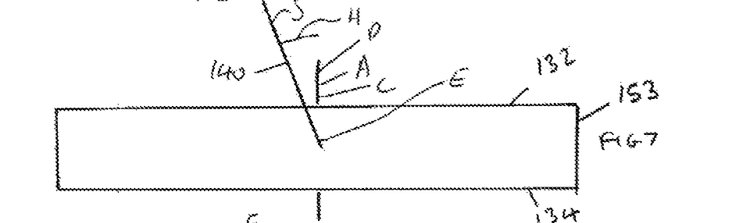
FIG. 7 shows a plan view of the brake of FIG. 6.
Figure 8:
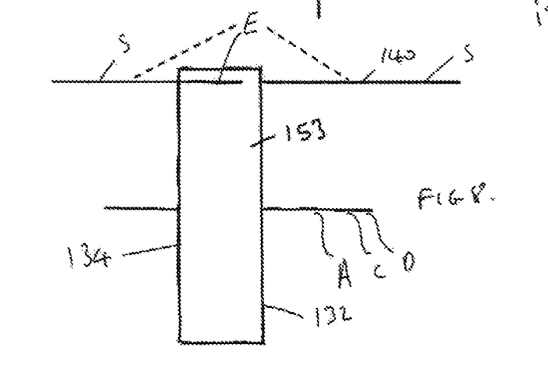
FIG. 8 shows a rear view of the brake of FIG. 6.

Thus, with reference to FIGS. 6 to 8, there is shown a brake 110 having a leading shoe 112 having a leading edge 114 and a trailing edge 116. Also shown is a trailing shoe 150 having a leading edge 151 and a trailing edge 152. A brake drum 153 surrounds the leading shoe 112 and the trailing shoe 114. The leading shoe 112 and the trailing shoe 114 are mounted on a brake support 130. An actuation shaft 140 (shown schematically in FIGS. 7 and 8) includes an actuation device 160 in the form of a Z-cam mechanism. The Z-cam mechanism includes a contoured shaft end 161 having pockets 162 and 163. Tappets 164 and 165 are slideably mounted in sleeves 166 and 167 mounted on the brake support 130. Each tappet 164 and 165 includes a pocket 164A and 165A.

One end of a push rod 168 sits in the pocket 162, and the opposite end of the push rod 168 sits in the pocket 164A. One end of a push rod 169 sits in the pocket 163, and an opposite end of the push rod 169 sits in the pocket 165A.

To apply the brake 10, the actuation shaft 140 is rotated in a counter-clockwise direction (when viewing FIG. 6), thereby causing the push rod 168 to move the tappet 164, which in turn moves the leading shoe 112 into engagement with the brake drum 153. Simultaneously, the push rod 169 causes the tappet 165 to slide, which in turn moves the trailing shoe 150 to engage the brake drum 153.

The drum rotates about a drum axis A. The leading and trailing shoe axes C and the wheel axis D are coincident with the drum axis A. The shaft axis S is skew relative to the drum axis A. This can best be seen in FIGS. 7 and 8. FIG. 7 clearly shows that the shaft axis S is non-parallel to the drum axis A. FIG. 8 clearly shows that the shaft axis S will not intersect the drum axis A. Point E is a point on the shaft axis S, which is closest to the drum axis A, and this is best seen by comparing FIGS. 7 and 8. In this case, the point E is on a midpoint of the drum. In further embodiments, as shown in phantom in FIG. 8, the point E could be on a non-mounting side 134 of the brake 110, or alternatively the point E could be on a mounting side of the brake 110.

FIG. 7 is a plan view of the brake 110. In other words, FIG. 7 is taken in the direction of an arrow F of FIG. 6, i.e., along a line joining the actuation device 160 (i.e., the Z-cam mechanism) with the drum axis A, that line being perpendicular to the drum axis A. As can be seen from FIG. 7, when viewed in this direction, a shaft axis H is angled relative to the drum axis A (in this case by approximately 20°) towards the leading shoe 112. In alternative embodiments, the shaft could be angled between 5° and 30°, alternatively between 5° and 20°, or alternatively between 5° and 15°, either towards the leading shoe 112 or towards the trailing shoe 114 when viewing FIG. 7.

FIG. 8 is a view taken in the direction of an arrow G, i.e., taken in the direction of a line perpendicular to a line joining the actuation device 160 with the drum axis A (that line being perpendicular to the drum axis A). As can be seen from FIG. 8, when viewed in this direction, the shaft axis S is not angled relative to the drum axis A, though in further embodiments shaft axis S could be angled (when viewed in this direction) such that the point E (the point on the shaft axis S which is closest to the drum axis A) is on the non mounting side, alternatively such that the point E is on the mounting side. When viewed in this direction, the shaft axis S can be angled relative to the drum axis A between 5° and 30°, alternatively between 5° and 20°, or alternatively between 5° and 15°.

The invention covers any angle (including 0°) between the shaft axis S and the drum axis A when viewed in the direction of the arrow G and any angle (including 0°) between the shaft axis S and the drum axis A when viewed in the direction of the arrow F where those axes are not parallel.

Figure 9:
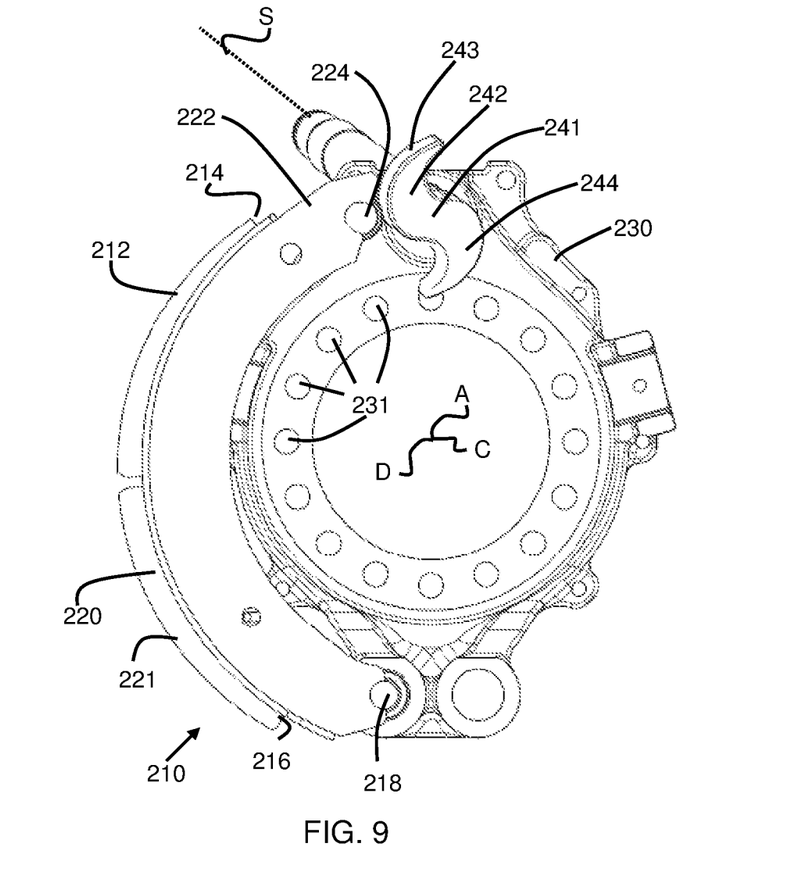
FIG. 9 shows a side elevation of a third embodiment of a brake.
Figure 10:
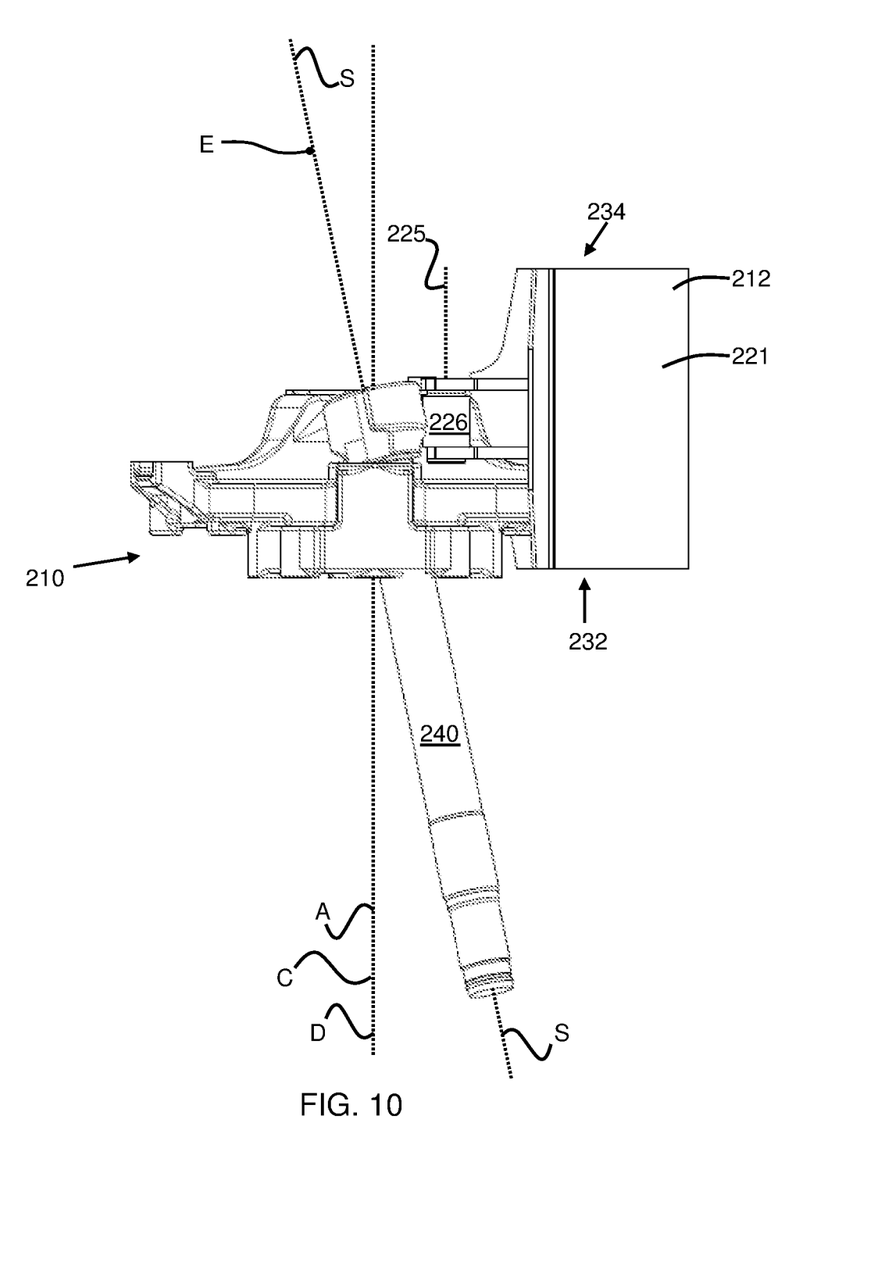
FIG. 10 shows a plan elevation of the brake of FIG. 9.

With reference to FIGS. 9 and 10, there is shown a third embodiment of a brake 210 according to the present invention in which features that fulfil the same function as those of the brake 10 are labelled 200 greater. As can be seen, the shaft axis S is angled (at a non 0 angle) relative to the drum axis A in the view of both FIGS. 9 and 10.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A brake comprising: a brake shoe pivotally mounted on a brake support, the brake support non-rotatably fixed to a vehicle, the brake shoe moveable between an engaged position and a disengaged position and defining an axis of rotation of an associated brake drum; an actuation shaft rotatably mounted about a shaft axis in a boss of the brake support; and an actuation device for transferring rotational movement of the actuation shaft into movement of the brake shoe from the disengaged position to the engaged position, wherein the axis of rotation of the associated brake drum is non-parallel to the shaft axis and is at a fixed angle relative to the shaft axis.

2. The brake as defined in claim 1, wherein the shaft axis intersects the axis of rotation.

3. The brake as defined in claim 2, wherein the brake shoe has a mounting side and a non-mounting side opposite to the mounting side, the brake shoe is supported on a brake support positioned on the mounting side of the brake shoe, and the shaft axis intersects the axis of rotation on the non-mounting side.

4. The brake as defined in claim 2, wherein the brake shoe has a mounting side and a non-mounting side opposite to the mounting side, the brake shoe is supported on a brake support positioned on the mounting side of the brake shoe, and the shaft axis intersects the axis of rotation on the mounting side.

5. The brake as defined in claim 1 wherein the axis of rotation intersects the shaft axis at an angle of between 5° and 30°.

6. The brake as defined in claim 1 wherein the axis of rotation intersects the shaft axis at an angle of between 5° and 20°.

7. The brake as defined in claim 1, wherein the actuation device is a push rod.

8. The brake as defined in claim 1, including a further brake shoe moveable between an engaged position of the further brake shoe and a disengaged position of the further brake shoe and a further actuation device for transferring rotational movement of the actuation shaft into movement of the further brake shoe from the disengaged position to the engaged position.

9. A brake comprising: a brake shoe moveable between an engaged position and a disengaged position and defining an axis of rotation of an associated brake drum; an actuation shaft rotatable about a shaft axis and rotatably mounted in a boss of a brake support fixed to a vehicle; and an actuation device for transferring rotational movement of the actuation shaft into movement of the brake shoe from the disengaged position to the engaged position, wherein the axis of rotation is non-parallel and at a fixed angle relative to the shaft axis, wherein the shaft axis does not intersect the axis of rotation.

10. The brake as defined in claim 9, wherein the brake shoe includes a mounting side and a non-mounting side opposite to the mounting side, and the brake shoe is supported on a brake support positioned on the mounting side of the brake shoe, and a point on the shaft axis closest to the axis of rotation is positioned on the non-mounting side.

11. The brake as defined in claim 9, wherein the brake shoe includes a mounting side and a non-mounting side opposite to the mounting side, and the brake shoe is supported on a brake support positioned on the mounting side of the brake shoe, and a point on the shaft axis positioned closest to the axis of rotation is positioned on the mounting side.

12. The brake as defined in claim 9, wherein the shaft axis is angled relative to a plane perpendicular to the axis of rotation between 5° and 30°.

13. The brake as defined in claim 9, wherein the shaft axis is angled relative to a plane perpendicular to the axis of rotation between 5° and 20°.

14. The brake as defined in claim 9 wherein the actuation device is a cam fixed on the actuation shaft.

15. The brake as defined in claim 14, wherein the cam contacts a surface of the brake shoe along a line parallel to the axis of rotation.

16. The brake as defined in claim 15, wherein the surface is defined on a roller having a major axis parallel to the axis of rotation.

17. The brake as defined in claim 14, wherein the cam contacts a surface of the brake shoe along a line parallel to the shaft axis.

18. The brake as defined in claim 17, wherein the surface is defined on a roller having a major axis parallel to the shaft axis.

19. The brake as defined in claim 14, wherein the cam contacts a surface of the brake shoe along a line non-parallel to the axis of rotation and non-parallel to the shaft axis.

20. The brake as defined in claim 19, wherein the surface is defined on a roller having a major axis which is non-parallel to the axis of rotation and which is non-parallel to the shaft axis.

21. The brake as defined in claim 1, wherein the associated brake drum is mounted on a hub of a wheel, and the axis of rotation of the associated brake drum is coincident with an axis of rotation of the wheel.

22. The brake as defined in claim 21 wherein the axis of rotation of the associated brake drum is positioned at a non-varying angle relative to the shaft axis of the actuation shaft during operation of the brake.

\* \* \* \* \*